United States Patent
Dai et al.

(10) Patent No.: US 12,408,143 B2
(45) Date of Patent: Sep. 2, 2025

(54) DATA TRANSMISSION METHOD AND APPARATUS, DEVICE, AND STORAGE MEDIUM

(71) Applicant: ZTE CORPORATION, Shenzhen (CN)

(72) Inventors: Bo Dai, Shenzhen (CN); Shuqiang Xia, Shenzhen (CN); Feng Xie, Shenzhen (CN); Guanghui Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 248 days.

(21) Appl. No.: 18/006,029

(22) PCT Filed: Jun. 30, 2021

(86) PCT No.: PCT/CN2021/103434
§ 371 (c)(1),
(2) Date: Jan. 19, 2023

(87) PCT Pub. No.: WO2022/017142
PCT Pub. Date: Jan. 27, 2022

(65) Prior Publication Data
US 2023/0300791 A1    Sep. 21, 2023

(30) Foreign Application Priority Data

Jul. 22, 2020 (CN) .......... 202010712277.2

(51) Int. Cl.
*H04W 68/02* (2009.01)
*H04L 5/00* (2006.01)

(52) U.S. Cl.
CPC .......... *H04W 68/02* (2013.01); *H04L 5/0005* (2013.01); *H04L 5/0051* (2013.01)

(58) Field of Classification Search
CPC .... H04W 68/02; H04W 68/00; H04L 5/0005; H04L 5/0007; H04L 5/0051;
(Continued)

(56) References Cited

U.S. PATENT DOCUMENTS

2019/0306739 A1* 10/2019 Kim ................. H04W 72/0453
2019/0320367 A1   10/2019 Zetterberg et al.
(Continued)

FOREIGN PATENT DOCUMENTS

CN    110831197 A    2/2020
CN    111164917 A    5/2020
(Continued)

OTHER PUBLICATIONS

Extended European Search Report in Application No. 21846689.4, dated Aug. 16, 2024, 8 pages.
(Continued)

*Primary Examiner* — Phong La
(74) *Attorney, Agent, or Firm* — Morgan, Lewis & Bockius LLP

(57) ABSTRACT

Provided are a data transmission method and apparatus, a device, and a storage medium. The method is applied to a first node. The method includes, in the case where the first node is in a connected state, receiving first-node-specific signaling, where the first-node-specific signaling carries idle-state transmission configuration information; and in the case where the first node is in the idle state, performing data transmission with a second node according to the idle-state transmission configuration information.

20 Claims, 3 Drawing Sheets

(58) Field of Classification Search
CPC ..... H04L 5/0048; H04L 5/005; H04L 5/0023; H04L 5/0016; H04L 5/0014; H04L 5/0021

See application file for complete search history.

(56) References Cited

U.S. PATENT DOCUMENTS

| | | |
|---|---|---|
| 2020/0037212 A1 | 1/2020 | Ramachandra et al. |
| 2020/0092813 A1* | 3/2020 | Kim ................. H04W 52/0229 |
| 2020/0221508 A1 | 7/2020 | Huang et al. |
| 2020/0229111 A1* | 7/2020 | Kim ..................... H04B 7/0695 |
| 2020/0267670 A1* | 8/2020 | Åström ............. H04W 52/0216 |
| 2021/0195517 A1* | 6/2021 | Yang ................. H04W 52/0212 |
| 2021/0274526 A1* | 9/2021 | Shin ..................... H04L 1/1896 |
| 2023/0300791 A1* | 9/2023 | Dai .................. H04W 52/0216 370/330 |

FOREIGN PATENT DOCUMENTS

| | | | | |
|---|---|---|---|---|
| CN | 111901855 A | | 11/2020 | |
| CN | 113271608 A | * | 8/2021 | ............. H04L 5/001 |
| KR | 10-2020-0047690 A | | 5/2020 | |
| KR | 10-2020-0053436 A | | 5/2020 | |
| WO | WO2019/056383 A1 | | 3/2019 | |
| WO | WO-2020167102 A1 | * | 8/2020 | ........... H04B 17/318 |
| WO | WO-2020193846 A1 | * | 10/2020 | ............ H04W 68/02 |

OTHER PUBLICATIONS

International Search Report in Application No. PCT/CN2021/103434, dated Sep. 28, 2021, 4 pages including translation.

First Office Action in Korean Application No. 10-2023-7006072 dated May 16, 2025, 11 pages, including translation.

* cited by examiner

DATA TRANSMISSION METHOD AND APPARATUS, DEVICE, AND STORAGE MEDIUM

CROSS REFERENCE TO RELATED APPLICATIONS

This is a National Stage Application filed under 35 U.S.C. 371, based on International Patent Application No. PCT/CN2021/103434, filed on Jun. 30, 2021, which claims priority to Chinese Patent Application No. 202010712277.2 filed with the China National Intellectual Property Administration (CNIPA) on Jul. 22, 2020, the disclosures of which are incorporated herein by reference in their entireties.

TECHNICAL FIELD

The present application relates to the field of communication technology, for example, a data transmission method and apparatus, a device, and a storage medium.

BACKGROUND

A cellular network architecture uses the technologies of frequency multiplexing and cell splitting to improve the spectrum resource utilization rate and the system capacity to support the rapid development of mobile communications. To satisfy the increasing demand for traffic, the evolution of mobile communications from 1G to 5G is based on cellular networks, that is, macrocell splitting and vertical microcell network layering.

With the deployment of various low-power nodes (LPNs) including various microcells, small cells, femtocells, and relay nodes in traditional cellular networks, cellular networks are increasingly dense. Since each small cell (microcell) is an independent cell, each time a user equipment (UE) enters a small cell, the UE requires to perform downlink synchronization once again to obtain system information of the small cell. The UE performs a channel switch frequently when moving in the idle state, wasting a large power consumption of the UE. If the network wants to page the UE, the network requires to perform paging in many small cells, but the UE is located in only one small cell, leading to a huge waste of downlink resources. The network sends synchronization and pages an idle UE based on a fixed cell deployment, limiting the flexibility of downlink data transmission, resulting in a decrease in the transmission efficiency, and increasing the power consumption of the network.

SUMMARY

The present application provides a data transmission method and apparatus, a device, and a storage medium to avoid a waste of resources and reduce UE power consumption and network power consumption.

An embodiment of the present application provides a data transmission method. The method is applied to a first node.

The method includes, in the case where the first node is in a connected state, receiving first-node-specific signaling, where the first-node-specific signaling carries idle-state transmission configuration information; and in the case where the first node is in the idle state, performing data transmission with a second node according to the idle-state transmission configuration information.

An embodiment of the present application provides another data transmission method. The method is applied to a second node.

The method includes, in the case where a first node is in the connected state, configuring first-node-specific signaling, where the first-node-specific signaling carries idle-state transmission configuration information; sending the first-node-specific signaling to the first node; and after the first node enters the idle state, performing data transmission with the first node according to the idle-state transmission configuration information.

An embodiment of the present application provides another data transmission method. The method is applied to a third node.

The method includes receiving idle-state transmission configuration information of a first node sent by a second node, where the idle-state transmission configuration information is used for data transmission between the second node and the first node when the first node is in the idle state; and in the case where a paging message for the first node is stored on the third node, sending the idle-state transmission configuration information to a fourth node.

An embodiment of the present application provides another data transmission method. The method is applied to a fourth node.

The method includes receiving idle-state transmission configuration information of a first node sent by a third node; and performing data transmission with the first node according to the idle-state transmission configuration information.

An embodiment of the present application provides a data transmission apparatus. The apparatus is configured on a first node. The apparatus includes a first receiving module and a first data transmission module.

The first receiving module is configured to, in the case where the first node is in the connected state, receive first-node-specific signaling, where the first-node-specific signaling carries idle-state transmission configuration information. The first data transmission module is configured to, in the case where the first node is in the idle state, perform data transmission with a second node according to the idle-state transmission configuration information.

An embodiment of the present application provides another data transmission apparatus. The apparatus is configured on a second node. The apparatus includes a configuration module, a first sending module, and a second data transmission module.

The configuration module is configured to, in the case where a first node is in the connected state, configure first-node-specific signaling, where the first-node-specific signaling carries idle-state transmission configuration information. The first sending module is configured to send the first-node-specific signaling to the first node. The second data transmission module is configured to, after the first node enters the idle state, perform data transmission with the first node according to the idle-state transmission configuration information.

An embodiment of the present application provides another data transmission apparatus. The apparatus is configured on a third node. The apparatus includes a second receiving module and a second sending module.

The second receiving module is configured to receive idle-state transmission configuration information of a first node sent by a second node, where the idle-state transmission configuration information is used for data transmission between the second node and the first node when the first node is in the idle state. The second sending module is configured to, in the case where a paging message for the first node is stored on the third node, send the idle-state transmission configuration information to a fourth node.

An embodiment of the present application provides another data transmission apparatus. The apparatus is configured on a fourth node. The apparatus includes a third receiving module and a third data transmission module.

The third receiving module is configured to receive idle-state transmission configuration information of a first node sent by a third node. The third data transmission module is configured to perform data transmission with the first node according to the idle-state transmission configuration information.

An embodiment of the present application provides a device.

The device includes at least one processor and a memory configured to store at least one program. The at least one processor is configured to execute the at least one program to perform the data transmission method of any embodiment of the present application.

An embodiment of the present application provides a storage medium. The storage medium stores a computer program which, when executed by a processor, causes the processor to perform the data transmission method of any embodiment of the present application.

DETAILED DESCRIPTION

Figure 1:
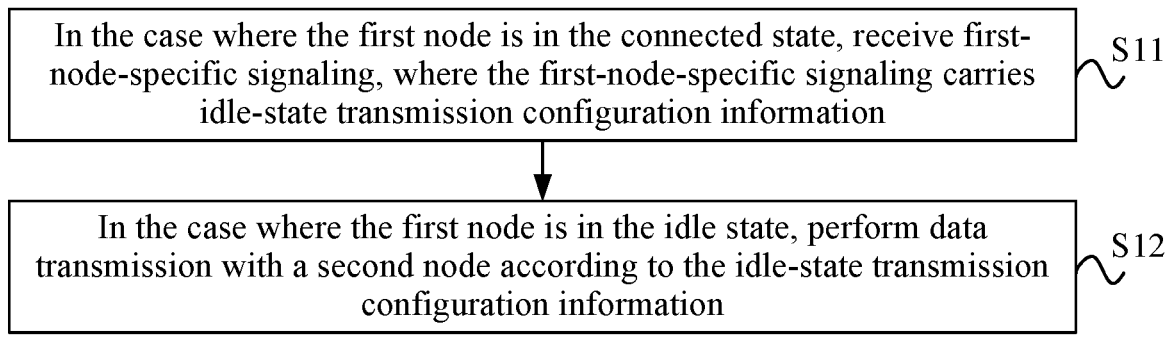
FIG. 1 is a flowchart of a data transmission method according to an embodiment of the present application.

Embodiments of the present application are described below in conjunction with drawings.

Steps illustrated in a flowchart among the drawings may be performed by, for example, a computer system capable of executing a set of computer-executable instructions. Moreover, a logical sequence is illustrated in the flowchart, but in some cases, the illustrated or described steps may be performed in a sequence different from the sequence described herein.

Solutions of the present application may be applied to communication systems including Global System for Mobile Communications (GSM), code-division multiple access (CDMA), wideband code-division multiple access (W-CDMA), general packet radio service (GPRS), long-term evolution (LTE), LTE Advanced (LTE-A), Universal Mobile Telecommunications System (UMTS), and 5th generation (5G). This is not limited in embodiments of the present application. In the present application, a 5G system is used as an example.

In embodiments of the present application, a base station may be a device for communicating with a user terminal. The base station may be a device having a wireless transceiving function. Here the device having a wireless transceiving function includes, but is not limited to, a NodeB, an evolved NodeB (eNodeB), a base station in a 5G communication system, a base station in a future communication system, an access node in a Wi-Fi system, a wireless relay node, or a wireless backhaul node. Alternatively, the base station may be a wireless controller in a cloud radio access network (C-RAN) scenario or may be a micro site or a transmission reference point (TRP). This is not limited in embodiments of the present application. In the present application, a 5G base station is used as an example.

In embodiments of the present application, a user terminal may be a device having a wireless transceiving function. The user terminal may be deployed on land, for example, deployed indoors or outdoors, handheld, wearable, or vehicle-mounted; may be deployed on water (for example, deployed on a ship); or may be deployed in the air (for example, deployed on a plane, balloon, or satellite). The user terminal may be a mobile phone, a pad, a computer having a wireless transceiving function, a virtual reality (VR) terminal, an augmented reality (AR) terminal, a wireless terminal in industrial control, a wireless terminal in self-driving, a wireless terminal in remote medicine, a wireless terminal in a smart grid, a wireless terminal in transportation safety, a wireless terminal in a smart city, or a wireless terminal in smart home. The application scenarios are not limited in embodiments of the present application. The user terminal may sometimes be called a terminal, an access terminal, a UE unit, a UE station, a mobile station, a mobile platform, a remote station, a remote terminal, a mobile equipment, a UE terminal, a wireless communication device, a UE agent, or a UE apparatus. This is not limited in embodiments of present application.

In an embodiment, a data transmission method is provided. As shown in FIG. 1, the data transmission method of this embodiment includes S11 and S12. The data transmission method of this embodiment is applied to a first node.

In S11, in the case where the first node is in the connected state, first-node-specific signaling is received, where the first-node-specific signaling carries idle-state transmission configuration information.

In S12, in the case where the first node is in the idle state, data transmission is performed with a second node according to the idle-state transmission configuration information.

The first node is any preceding user terminal. The second node is any preceding base station.

In an example embodiment, the first-node-specific signaling includes radio resource control (RRC) signaling.

In an example embodiment, the idle-state transmission configuration information includes at least one of configuration information of a downlink synchronization signal, paging configuration information, or access configuration information.

In an example embodiment, the configuration information of the downlink synchronization signal includes at least one of generation information of a downlink synchronization signal sequence or time-frequency location information of the downlink synchronization signal, where the generation information of the downlink synchronization signal sequence is used for generating the downlink synchronization signal sequence, and the time-frequency location information of the downlink synchronization signal includes time-domain location information of the downlink synchronization signal and frequency-domain location information of the downlink synchronization signal.

In an example embodiment, the time-frequency location information of the downlink synchronization signal includes at least one of a first period, a start subframe, the number of consecutive subframes, or the number of spaced subframes.

In an example embodiment, the time-domain location of the downlink synchronization signal includes at least one of the following: the downlink synchronization signal being transmitted on multiple orthogonal frequency-division multiplexing (OFDM) symbols in a subframe; the downlink synchronization signal being transmitted on M consecutive subframes from the start subframe, where M is a positive integer; or the downlink synchronization signal being transmitted on R subframes at intervals of G subframes from the start subframe, where R is a positive integer, and G is a positive integer greater than or equal to R.

In an example embodiment, the first period is a multiple of a search space period corresponding to a paging message or a multiple of a search space period corresponding to an access response message.

In an example embodiment, the start subframe or the end subframe of the downlink synchronization signal is determined by the relative offset and the start subframe of a search space corresponding to a paging message.

In an example embodiment, the frequency-domain location information of the downlink synchronization signal includes at least one of the following: frequency point location information, a frequency-domain location, or a frequency-domain offset.

In an example embodiment, the paging configuration information includes at least one of a paging radio network temporary identifier (RNTI), information about a paging search space, or paging synchronization signal configuration information.

In an example embodiment, the information about the paging search space includes at least one of the following: a second period, an aggregation level, the number of candidate sets corresponding to the aggregation level, the number of repetitions, or a time-frequency location of the paging search space.

In an example embodiment, the access configuration information includes at least one of a third period, an access signal type, an access response search space, or location information of an access resource.

In an example embodiment, the third period is determined in at least one of the following manners: being configured through signaling; or being determined according to a search space period corresponding to a paging message.

In an example embodiment, the time-domain location in the location information of the access resource is determined according to the time-domain location offset of the paging search space.

In an example embodiment, the start time-domain location of the downlink synchronization signal is located before the start time-domain location of the paging search space, or the start time-domain location of the paging search space is located before the start time-domain location of the access resource, or the start time-domain location of the access resource is located before the start time-domain location of the access response search space.

In an example embodiment, the downlink synchronization signal, the paging search space, and the access response search space are located at the same frequency point.

In an example embodiment, the downlink synchronization signal, the paging search space, and the access response search space are received within continuous resources in the same bandwidth part (BWP).

In an example embodiment, performing the data transmission with the second node according to the idle-state transmission configuration information includes at least one of the following: receiving the downlink synchronization signal according to the configuration information of the downlink synchronization signal; receiving a paging message according to the paging configuration information; or sending an access signal or access information according to the access configuration information.

In an example embodiment, receiving the paging message according to the paging configuration information includes detecting, on the paging search space, a physical downlink control channel (PDCCH) scrambled by the paging RNTI; or in the case where a paging message corresponding to the first node is received, sending the access signal or the access information at the position of the access resource, and detecting an access response on the access response search space.

In an example embodiment, receiving the downlink synchronization signal according to the configuration information of the downlink synchronization signal includes at least one of the following: when a detected paging downlink synchronization signal is different from a paging downlink synchronization signal configured through the paging configuration information, sending the access signal or the access information at the location of the access resource; when a detected downlink synchronization signal is different from the downlink synchronization signal configured through the configuration information of the downlink synchronization signal, sending the access signal or the access information at the location of the access resource; when the strength of a detected downlink synchronization signal is less than a preset strength threshold, sending the access signal or the access information at the location of the access resource; or when the strength of a detected paging downlink synchronization signal is less than a preset strength threshold, sending the access signal or the access information at the location of the access resource.

In an example embodiment, the idle state includes a first idle state, where the first idle state refers to a state in which the first node releases connected-state transmission configuration information, retains the idle-state transmission configuration information configured in the connected state, and performs detection according to the idle-state transmission configuration information.

In an example embodiment, the idle state includes a first idle state and a second idle state, where the second idle state is a state in which the first node detects, after releasing the connected-state transmission configuration information, a paging-corresponding PDCCH according to paging configuration information configured through a system message or a state in which the first node performs synchronization signal detection according to a predefined synchronization signal after releasing the connected-state transmission configuration information.

In an example embodiment, the condition under which the first node switches from the first idle state to the second idle state includes at least one of the following: a detected paging downlink synchronization signal is different from a paging downlink synchronization signal configured through the paging configuration information; a detected downlink synchronization signal is different from a downlink synchronization signal configured through configuration information of the downlink synchronization signal; the strength of a detected downlink synchronization signal is less than a first preset strength threshold; or the strength of a detected paging downlink synchronization signal is less than a second preset strength threshold.

That a detected paging downlink synchronization signal is different from a paging downlink synchronization signal configured through the paging configuration information means that the strongest signal detected by the first node is different from a paging downlink synchronization signal configured through the paging configuration information. That a detected downlink synchronization signal is different from a downlink synchronization signal configured through configuration information of the downlink synchronization signal means that the strongest signal detected by the first node is different from a downlink synchronization signal configured through configuration information of the downlink synchronization signal. The preceding subframe is a time-domain unit. The preceding subframe may be a timeslot or may be a time-domain unit consisting of R time-domain symbols.

Figure 2:
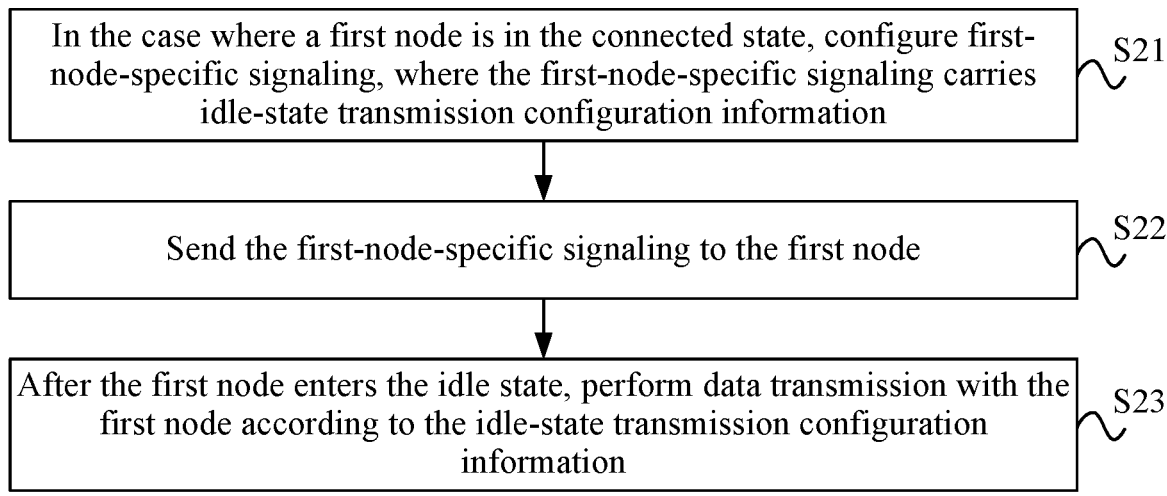
FIG. 2 is a flowchart of a data transmission method according to an embodiment of the present application.

In an embodiment, a data transmission method is provided. As shown in FIG. 2, the data transmission method of this embodiment includes S21, S22, and S23. The data transmission method of this embodiment is applied to a second node.

In S21, in the case where a first node is in the connected state, first-node-specific signaling is configured, where the first-node-specific signaling carries idle-state transmission configuration information.

In S22, the first-node-specific signaling is sent to the first node.

In S23, after the first node enters the idle state, data transmission is performed with the first node according to the idle-state transmission configuration information.

In an example embodiment, the idle-state transmission configuration information includes at least one of configuration information of a downlink synchronization signal, paging configuration information, or access configuration information.

In an example embodiment, performing the data transmission with the first node according to the idle-state transmission configuration information includes at least one of the following: sending the downlink synchronization signal according to the configuration information of the downlink synchronization signal; sending a paging message for the first node according to the paging configuration information; or receiving an access signal or access information of the first node according to the access configuration information.

In an example embodiment, the method also includes sending the idle-state transmission configuration information to a third node.

In an example embodiment, the first-node-specific signaling includes radio resource control (RRC) signaling.

In an example embodiment, the configuration information of the downlink synchronization signal includes at least one of generation information of a downlink synchronization signal sequence or time-frequency location information of the downlink synchronization signal, where the generation information of the downlink synchronization signal sequence is used for generating the downlink synchronization signal sequence, and the time-frequency location information of the downlink synchronization signal includes time-domain location information of the downlink synchronization signal and frequency-domain location information of the downlink synchronization signal.

In an example embodiment, the time-frequency location information of the downlink synchronization signal includes at least one of a first period, a start subframe, the number of consecutive subframes, or the number of spaced subframes.

In an example embodiment, the time-domain location of the downlink synchronization signal includes at least one of the following: the downlink synchronization signal being transmitted on multiple orthogonal frequency-division multiplexing (OFDM) symbols in a subframe; the downlink synchronization signal being transmitted on M consecutive subframes from the start subframe, where M is a positive integer; or the downlink synchronization signal being transmitted on R subframes at intervals of G subframes from the start subframe, where R is a positive integer, and G is a positive integer greater than or equal to R.

In an example embodiment, the first period is a multiple of a search space period corresponding to a paging message or a multiple of a search space period corresponding to an access response message.

In an example embodiment, the start subframe or the end subframe of the downlink synchronization signal is determined by the relative offset and the start subframe of a search space corresponding to a paging message.

In an example embodiment, the frequency-domain location information of the downlink synchronization signal includes at least one of the following: frequency point location information, a frequency-domain location, or a frequency-domain offset.

In an example embodiment, the paging configuration information includes at least one of a paging radio network temporary identifier (RNTI), information about a paging search space, or paging synchronization signal configuration information.

In an example embodiment, the information about the paging search space includes at least one of the following: a second period, an aggregation level, the number of candidate sets corresponding to the aggregation level, the number of repetitions, or a time-frequency location of the paging search space.

In an example embodiment, the access configuration information includes at least one of a third period, an access signal type, an access response search space, or location information of an access resource.

In an example embodiment, the third period is determined in at least one of the following manners: being configured through signaling; or being determined according to a search space period corresponding to a paging message.

In an example embodiment, the time-domain location in the location information of the access resource is determined according to the time-domain location offset of the paging search space.

In an example embodiment, the start time-domain location of the downlink synchronization signal is located before the start time-domain location of the paging search space, or the start time-domain location of the paging search space is located before the start time-domain location of the access resource, or the start time-domain location of the access resource is located before the start time-domain location of the access response search space.

In an example embodiment, the downlink synchronization signal, the paging search space, and the access response search space are located at the same frequency point.

In an example embodiment, the downlink synchronization signal, the paging search space, and the access response search space are received within continuous resources in the same bandwidth part (BWP).

In an example embodiment, the idle state includes a first idle state, where the first idle state refers to a state in which the first node releases connected-state transmission configuration information, retains the idle-state transmission configuration information configured in the connected state, and performs detection according to the idle-state transmission configuration information.

In an example embodiment, the idle state includes a first idle state and a second idle state, where the second idle state is a state in which the first node detects, after releasing the connected-state transmission configuration information, a paging-corresponding PDCCH according to paging configuration information configured through a system message or a state in which the first node performs synchronization signal detection according to a predefined synchronization signal after releasing the connected-state transmission configuration information.

In an example embodiment, the condition under which the first node switches from the first idle state to the second idle state includes at least one of the following: a detected paging downlink synchronization signal is different from a paging downlink synchronization signal configured through the paging configuration information; a detected downlink synchronization signal is different from a downlink synchronization signal configured through configuration information of the downlink synchronization signal; the strength of a detected downlink synchronization signal is less than a first preset strength threshold; or the strength of a detected paging downlink synchronization signal is less than a second preset strength threshold.

Figure 3:
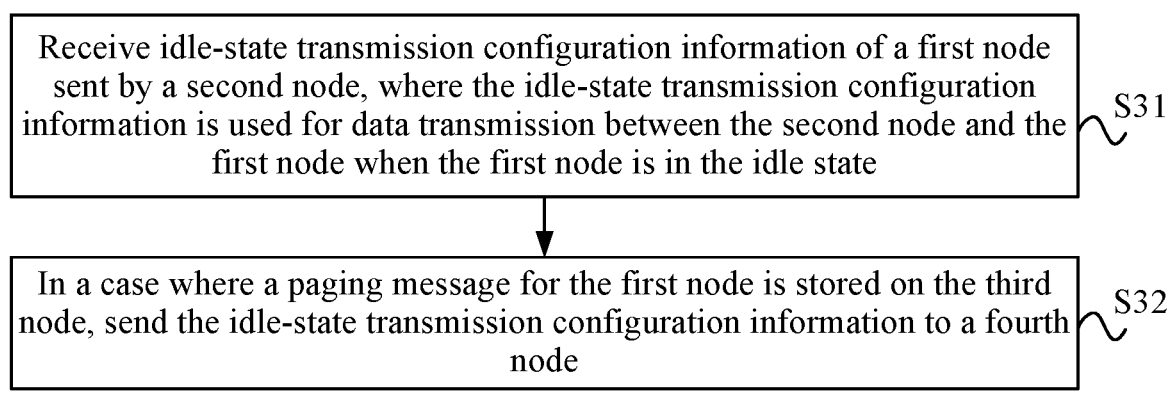
FIG. 3 is a flowchart of a data transmission method according to an embodiment of the present application.

In an embodiment, a data transmission method is provided. As shown in FIG. 3, the data transmission method of this embodiment includes S31 and S32. The data transmission method of this embodiment is applied to a third node.

In S31, idle-state transmission configuration information of a first node sent by a second node is received, where the idle-state transmission configuration information is used for data transmission between the second node and the first node when the first node is in the idle state.

In S32, in the case where a paging message for the first node is stored on the third node, the idle-state transmission configuration information is sent to a fourth node.

The third node is a core network.

In an example embodiment, the idle-state transmission configuration information includes at least one of configuration information of a downlink synchronization signal, paging configuration information, or access configuration information.

In an example embodiment, the first-node-specific signaling includes radio resource control (RRC) signaling.

In an example embodiment, the configuration information of the downlink synchronization signal includes at least one of generation information of a downlink synchronization signal sequence or time-frequency location information of the downlink synchronization signal, where the generation information of the downlink synchronization signal sequence is used for generating the downlink synchronization signal sequence, and the time-frequency location information of the downlink synchronization signal includes time-domain location information of the downlink synchronization signal and frequency-domain location information of the downlink synchronization signal.

In an example embodiment, the time-frequency location information of the downlink synchronization signal includes at least one of a first period, a start subframe, the number of consecutive subframes, or the number of spaced subframes.

In an example embodiment, the time-domain location of the downlink synchronization signal includes at least one of the following: the downlink synchronization signal being transmitted on multiple orthogonal frequency-division multiplexing (OFDM) symbols in a subframe; the downlink synchronization signal being transmitted on M consecutive subframes from the start subframe, where M is a positive integer; or the downlink synchronization signal being transmitted on R subframes at intervals of G subframes from the start subframe, where R is a positive integer, and G is a positive integer greater than or equal to R.

In an example embodiment, the first period is a multiple of a search space period corresponding to a paging message or a multiple of a search space period corresponding to an access response message.

In an example embodiment, the start subframe or the end subframe of the downlink synchronization signal is determined by the relative offset and the start subframe of a search space corresponding to a paging message.

In an example embodiment, the frequency-domain location information of the downlink synchronization signal includes at least one of the following: frequency point location information, a frequency-domain location, or a frequency-domain offset.

In an example embodiment, the paging configuration information includes at least one of a paging radio network temporary identifier (RNTI), information about a paging search space, or paging synchronization signal configuration information.

In an example embodiment, the information about the paging search space includes at least one of the following: a second period, an aggregation level, the number of candidate sets corresponding to the aggregation level, the number of repetitions, or a time-frequency location of the paging search space.

In an example embodiment, the access configuration information includes at least one of a third period, an access signal type, an access response search space, or location information of an access resource.

In an example embodiment, the third period is determined in at least one of the following manners: being configured through signaling; or being determined according to a search space period corresponding to a paging message.

In an example embodiment, the time-domain location in the location information of the access resource is determined according to the time-domain location offset of the paging search space.

In an example embodiment, the start time-domain location of the downlink synchronization signal is located before the start time-domain location of the paging search space, or the start time-domain location of the paging search space is located before the start time-domain location of the access resource, or the start time-domain location of the access resource is located before the start time-domain location of the access response search space.

In an example embodiment, the downlink synchronization signal, the paging search space, and the access response search space are located at the same frequency point.

In an example embodiment, the downlink synchronization signal, the paging search space, and the access response search space are received within continuous resources in the same bandwidth part (BWP).

In an example embodiment, receiving the paging message according to the paging configuration information includes detecting, on the paging search space, a physical downlink control channel (PDCCH) scrambled by the paging RNTI; or in the case where a paging message corresponding to the first node is received, sending the access signal or the access information at the position of the access resource, and detecting an access response on the access response search space.

In an example embodiment, the idle state includes a first idle state, where the first idle state refers to a state in which the first node releases connected-state transmission configuration information, retains the idle-state transmission configuration information configured in the connected state, and performs detection according to the idle-state transmission configuration information.

In an example embodiment, the idle state includes a first idle state and a second idle state, where the second idle state is a state in which the first node detects, after releasing the connected-state transmission configuration information, a paging-corresponding PDCCH according to paging configuration information configured through a system message or a state in which the first node performs synchronization signal detection according to a predefined synchronization signal after releasing the connected-state transmission configuration information.

In an example embodiment, the condition under which the first node switches from the first idle state to the second idle state includes at least one of the following: a detected paging downlink synchronization signal is different from a paging downlink synchronization signal configured through the paging configuration information; a detected downlink synchronization signal is different from a downlink synchronization signal configured through configuration information of the downlink synchronization signal; the strength of a detected downlink synchronization signal is less than a first preset strength threshold; or the strength of a detected paging downlink synchronization signal is less than a second preset strength threshold.

Figure 4:
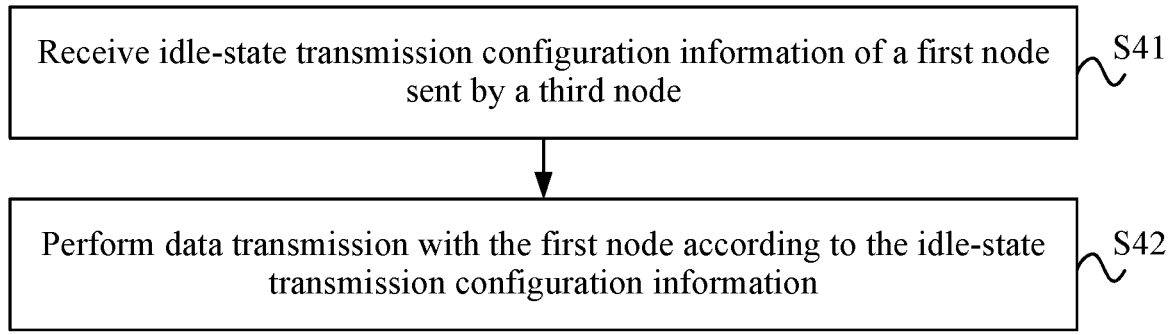
FIG. 4 is a flowchart of a data transmission method according to an embodiment of the present application.

In an embodiment, a data transmission method is provided. As shown in FIG. 4, the data transmission method of this embodiment includes S41 and S42. The data transmission method of this embodiment is applied to a fourth node.

In S41, idle-state transmission configuration information of a first node sent by a third node is received.

In S42, data transmission is performed with the first node according to the idle-state transmission configuration information.

In an example embodiment, the idle-state transmission configuration information includes at least one of configuration information of a downlink synchronization signal, paging configuration information, or access configuration information.

The fourth node is a base station other than the second node.

In an example embodiment, the first-node-specific signaling includes radio resource control (RRC) signaling.

In an example embodiment, the configuration information of the downlink synchronization signal includes at least one of generation information of a downlink synchronization signal sequence or time-frequency location information of the downlink synchronization signal, where the generation information of the downlink synchronization signal sequence is used for generating the downlink synchronization signal sequence, and the time-frequency location information of the downlink synchronization signal includes time-domain location information of the downlink synchronization signal and frequency-domain location information of the downlink synchronization signal.

In an example embodiment, the time-frequency location information of the downlink synchronization signal includes at least one of a first period, a start subframe, the number of consecutive subframes, or the number of spaced subframes.

In an example embodiment, the time-domain location of the downlink synchronization signal includes at least one of the following: the downlink synchronization signal being transmitted on multiple orthogonal frequency-division multiplexing (OFDM) symbols in a subframe; the downlink synchronization signal being transmitted on M consecutive subframes from the start subframe, where M is a positive integer; or the downlink synchronization signal being transmitted on R subframes at intervals of G subframes from the start subframe, where R is a positive integer, and G is a positive integer greater than or equal to R.

In an example embodiment, the first period is a multiple of a search space period corresponding to a paging message or a multiple of a search space period corresponding to an access response message.

In an example embodiment, the start subframe or the end subframe of the downlink synchronization signal is determined by the relative offset and the start subframe of a search space corresponding to a paging message.

In an example embodiment, the frequency-domain location information of the downlink synchronization signal includes at least one of the following: frequency point location information, a frequency-domain location, or a frequency-domain offset.

In an example embodiment, the paging configuration information includes at least one of a paging radio network temporary identifier (RNTI), information about a paging search space, or paging synchronization signal configuration information.

In an example embodiment, the information about the paging search space includes at least one of the following: a second period, an aggregation level, the number of candidate sets corresponding to the aggregation level, the number of repetitions, or a time-frequency location of the paging search space.

In an example embodiment, the access configuration information includes at least one of a third period, an access signal type, an access response search space, or location information of an access resource.

In an example embodiment, the third period is determined in at least one of the following manners: being configured through signaling; or being determined according to a search space period corresponding to a paging message.

In an example embodiment, the time-domain location in the location information of the access resource is determined according to the time-domain location offset of the paging search space.

In an example embodiment, the start time-domain location of the downlink synchronization signal is located before the start time-domain location of the paging search space, or the start time-domain location of the paging search space is located before the start time-domain location of the access resource, or the start time-domain location of the access resource is located before the start time-domain location of the access response search space.

In an example embodiment, the downlink synchronization signal, the paging search space, and the access response search space are located at the same frequency point.

In an example embodiment, the downlink synchronization signal, the paging search space, and the access response search space are received within continuous resources in the same bandwidth part (BWP).

In an example embodiment, receiving the paging message according to the paging configuration information includes detecting, on the paging search space, a physical downlink control channel (PDCCH) scrambled by the paging RNTI; or in the case where a paging message corresponding to the first node is received, sending the access signal or the access information at the position of the access resource, and detecting an access response on the access response search space.

In an example embodiment, the idle state includes a first idle state, where the first idle state refers to a state in which the first node releases connected-state transmission configuration information, retains the idle-state transmission configuration information configured in the connected state, and performs detection according to the idle-state transmission configuration information.

In an example embodiment, the idle state includes a first idle state and a second idle state, where the second idle state is a state in which the first node detects, after releasing the connected-state transmission configuration information, a paging-corresponding PDCCH according to paging configuration information configured through a system message or a state in which the first node performs synchronization signal detection according to a predefined synchronization signal after releasing the connected-state transmission configuration information.

In an example embodiment, the condition under which the first node switches from the first idle state to the second idle state includes at least one of the following: a detected paging downlink synchronization signal is different from a paging downlink synchronization signal configured through the paging configuration information; a detected downlink synchronization signal is different from a downlink synchronization signal configured through configuration information of the downlink synchronization signal; the strength of a detected downlink synchronization signal is less than a first preset strength threshold; or the strength of a detected paging downlink synchronization signal is less than a second preset strength threshold.

In an embodiment, a data transmission method is provided.

After a UE is powered on, is disconnected, or falls into a deep sleep, the UE accesses a network in the manners below.

Manner One

The UE tries to detect a downlink synchronization signal. After the downlink synchronization signal is found, the UE receives a master information block (MIB) and system information (SI) and initiates uplink access according to the access configuration information of the SI. If the UE does not detect the downlink synchronization signal, the UE initiates a predefined access signal at a predefined location, detects an access response at the predefined location, receives the access response, and sends a message according to scheduling information in the access response to access the network.

Manner Two

The UE initiates a predefined access signal at a predefined location, detects an access response at the predefined location, receives the access response, and sends a message according to scheduling information in the access response to access the network.

After the UE accesses the network (or enters the connected state), a base station configures, through UE-specific RRC signaling, a UE-specific RNTI, a UE-specific search space (USS), radio frame information, connected-state UE-specific synchronization signal configuration information, a connected-state UE resource reference point, and information about data transmission and measurement and feedback; and the UE detects the USS and receive and send data. The connected-state UE-specific synchronization signal configuration information includes synchronization signal identification information and/or synchronization signal time-frequency location information. The synchronization signal identification information is configured to generate a synchronization sequence. The synchronization signal time-frequency location information is determined in two manners.

Manner One

The synchronization signal time-frequency location information includes a downlink frequency point and a frequency-domain location based on the downlink frequency point. In the information, the synchronization signal period and the time-domain location of a synchronization signal may be predefined or may be configured by the UE-specific signaling.

The connected-state UE resource reference point represents a downlink resource reference point. A downlink resource location configured by the base station in the UE connected state is defined based on the reference point. The connected-state UE resource reference point is defined based on the synchronization signal time-frequency location.

Manner Two

The synchronization signal time-frequency location information includes a frequency-domain location defined based on a downlink resource reference point. In the information, the synchronization signal period and the synchronization signal time-domain location may be predefined or may be configured by the UE-specific signaling.

The connected-state UE resource reference point represents a downlink resource reference point. A downlink resource location configured by the base station in the UE connected state is defined based on the reference point. The downlink resource reference point is indicated by frequency point information.

The connected-state UE-specific synchronization signal may carry subframe information and part of radio frame information or may carry only part of radio frame information.

The radio frame information includes at least a first part of information and a second part of information. The first part of information is indicated by the UE-specific RRC signaling. The second part of information is carried by the connected-state UE-specific synchronization signal.

The second part of information includes at least two subdivisions. The first subdivision is carried by a first signal period. The second subdivision is carried by a first signal sequence. Similar to a synchronization signal transmission method in an LTE system and a New Radio (NR) system, a synchronization signal sequence is generated based on a synchronization identifier and the radio frame information.

A first signal is transmitted at a period of one radio frame. When a first signal is detected, the boundary of one radio frame is determined. A first signal is located on a fixed symbol in a fixed slot of a radio frame. The boundary of a subframe and the boundary of a time-domain symbol can be determined by only a first signal.

The connected-state UE-specific synchronization signal is configured to determine the connected-state UE resource reference point, for example, the start radio frame, the start slot, the start OFDM symbol, or the start superframe.

Downlink synchronization signal configuration information detected by the UE in the idle state is configured by the UE-specific RRC signaling.

The downlink synchronization signal configuration information includes generation information of a downlink synchronization signal sequence and/or time-frequency location information of a downlink synchronization signal. The generation information of the downlink synchronization signal sequence is used for generating the downlink synchronization signal sequence.

The time-domain location in the time-frequency location information of the downlink synchronization signal is indicated using the time-domain location (the start time-domain location or the end time-domain location) of a paging search space as a reference point; is indicated using a connected-state UE time-domain resource configured by the UE-specific RRC signaling as a reference point; or is indicated by signaling.

The frequency-domain location in the time-frequency location information of the downlink synchronization signal is jointly indicated by a frequency point and a frequency-domain location relative to the frequency point; is indicated using the frequency-domain location (the start frequency-domain location or the end frequency-domain location) of a paging search space as a reference point; is indicated using a frequency-domain resource configured by the UE-specific RRC signaling as a reference point; or is indicated by signaling.

A UE paging RNTI and a paging search space are configured by the UE-specific RRC signaling.

The time-domain location of the paging search space is indicated using the time-domain location (the start time-domain location or the end time-domain location) of the idle-state downlink synchronization signal as a reference point; or is indicated using a connected-state UE time-domain resource configured by the UE-specific RRC signaling as a reference point.

The frequency-domain location of the paging search space is jointly indicated by a frequency point and a frequency-domain location relative to the frequency point; is indicated using the frequency-domain location (the start frequency-domain location or the end frequency-domain location) of the idle-state downlink synchronization signal as a reference point; is indicated using a frequency-domain resource configured by the UE-specific RRC signaling as a reference point; or is indicated by signaling.

An access resource location, an access signal type, and an access response search space are configured by the UE-specific RRC signaling. The configured information is used in a scenario where no synchronization signal and no SI are detected or a scenario where there is a need to access the network.

The time-domain location of an access resource is indicated using the time-domain location (the start time-domain location or the end time-domain location) of a paging search space as a reference point; is indicated using the time-domain location (the start time-domain location or the end time-domain location) of the idle-state downlink synchronization signal as a reference point; is indicated using a connected-state UE time-domain resource configured by the UE-specific RRC signaling as a reference point; or is indicated by signaling.

The frequency-domain location of the access resource is jointly indicated by a frequency point and a frequency-domain location relative to the frequency point.

The time-domain location of the access response search space is indicated using the time-domain location (the start time-domain location or the end time-domain location) of an access resource as a reference point; is indicated using the time-domain location (the start time-domain location or the end time-domain location) of a paging search space as a reference point; is indicated using the time-domain location (the start time-domain location or the end time-domain location) of the idle-state downlink synchronization signal as a reference point; is indicated using a connected-state UE time-domain resource configured by the UE-specific RRC signaling as a reference point; or is indicated by signaling.

The frequency-domain location of the access response search space is jointly indicated by a frequency point and a frequency-domain location relative to the frequency point; is indicated using the frequency-domain location (the start frequency-domain location or the end frequency-domain location) of a paging search space as a reference point; is indicated using a frequency-domain resource configured by the UE-specific RRC signaling as a reference point; or is indicated by signaling.

Special Configuration One

The start time-domain location of the idle-state downlink synchronization signal is located before the start time-domain location of the paging search space. The start time-domain location of the paging search space is located before the start time-domain location of the access resource. The start time-domain location of the access resource is located before the start time-domain location of the access response search space.

Special Configuration Two

The idle-state downlink synchronization signal and the paging search space are located at the same frequency point. The paging search space and the access response search space are located at the same frequency point. The idle-state downlink synchronization signal and the access response search space are located at the same frequency point.

Special Configuration Three

The idle-state downlink synchronization signal, the paging search space, the access response search space are located within the same continuous bandwidth, for example, a 20 MHz contiguous bandwidth, a 50 MHz contiguous bandwidth, or an 80 MHz contiguous bandwidth.

After the UE accesses the network (or enters the connected state), the base station also configures, through the UE-specific RRC signaling, a synchronization signal for the UE to detect a paging PDCCH (or for downlink synchronization at the time of uplink access). The access resource is after the paging resource. The UE uses the paging synchronization signal to perform downlink synchronization and sends an uplink access signal. Alternatively, the UE does not configure a synchronization signal for the UE to detect a paging PDCCH, and the UE uses the idle-state downlink synchronization signal to perform synchronization and auxiliary paging detection.

After the UE enters the idle state, the UE tries to detect, on the designated paging search space, a paging PDCCH scrambled by the paging RNTI. If a paging message is received or uplink data transmission is performed, the UE tries to detect a synchronization signal block (SSB) and an SI. If an SSB and an SI are detected, the UE accesses the network in a general process. If no SSB and SI are detected, the UE initiates an access signal at the configured access resource location and detects an access response on an access response search space to access the network. Before the UE in the idle state detects the paging PDCCH, the UE may perform downlink synchronization by using the UE-specific synchronization signal.

When the paging downlink synchronization signal detected by the UE is different from the configured synchronization signal, the UE initiates access and updates the paging configuration (or the paging area); or when the idle-state downlink synchronization signal detected by the UE is different from the configured synchronization signal, the UE initiates access and updates the paging configuration; or when the strength of the idle-state downlink synchronization signal detected by the UE is less than the threshold, the UE initiates access and updates the paging configuration; or when the strength of the paging downlink synchronization signal detected by the UE is less than the threshold, the UE initiates access and updates the paging configuration.

The eNB under which the UE resides in the connected state sends at least one of the access configuration, the synchronization configuration, the UE clock, or the paging configuration configured by the UE-specific RRC signaling configuration in the connected state to a mobility management entity (MME), an access management function (AMF), or a third node.

The MME, the AMF, or the third node sends an intra-area base station at least one of the access configuration, the synchronization configuration, the UE clock, or the paging configuration of the UE reported by the eNB. The base station pages the UE according to the received configuration and detects the UE access. Different paging areas correspond to different paging synchronization signals. The base station may use a macro site to transmit a paging message or may select an access point (AP) to transmit a paging message. The base station may transmit an access response by using a macro site or may jointly transmit an access response by using multiple APs. The base station requires to ensure that the sent UE-specific synchronization signal is consistent with the paging transmission.

The idle state includes a first idle state and a second idle state. A state in which the UE uses, after release of the connected state, the paging configuration information or the synchronization configuration information configured in the connected state is the first idle state. A state in which the UE detects, after release of the connected state, a PDCCH corresponding to paging according to the paging configuration information configured through the system message is the second idle state. Alternatively, a state in which the UE performs synchronization signal detection according to a predefined synchronization signal after release of the connected state is the second idle state.

The RRC message for sending the paging configuration, the access configuration, and the synchronization configuration may be an RRC release message, or may be another RRC message, for example, an RRC setup complete message.

The preceding solution has the following features: The UE no longer requires to detect a cell-specific synchronization signal, an MIB, and an SI (the transmission density of the synchronization signal and the transmission density of the MIB may also be reduced). The downlink synchronization signal is transmitted only in the vicinity of the paging PDCCH area. The access resource and the access response are configured by using the paging area as a reference point. Moreover, the paging area is updated and identified according to the paging synchronization signal detection, and the UE may move freely in the area without channel switch, thereby reducing the power consumption of the UE.

In an embodiment, after the UE accesses the network, the base station configures, through the UE-specific signaling, the time-domain location, frequency-domain location, and downlink synchronization signal sequence generation information of the downlink synchronization signal detected by the UE in the idle state or inactive state.

The time-domain location includes a first period, a start subframe, and the number of consecutive or spaced subframes. The downlink synchronization signal may be transmitted on multiple OFDM symbols in a subframe, for example, n consecutive OFDM symbols, where n is a positive integer from 2 to 14, or may be transmitted on only one OFDM symbol.

The downlink synchronization signal is transmitted on M consecutive subframes starting from the start subframe. M is a positive integer, for example, a multiple of 2. Alternatively, the downlink synchronization signal is transmitted on R subframes, for example, on $x+g*h+T*k$ subframes starting from subframe x at intervals of g subframes. h is an integer from 0 to R−1. T is the number of subframes included in the first period. k is a period index. The value of k is 0, 1, 2, . . . g is a predefined value or is configured by the UE-specific signaling.

The frequency-domain location of the downlink synchronization signal includes frequency point location information and the frequency-domain location based on the frequency point. For example, the corresponding frequency point location is indicated by signaling, and the offset location relative to the frequency point is indicated by another signaling to serve as the start location or the end location of the frequency domain of the downlink synchronization signal. The frequency-domain bandwidth of the downlink synchronization signal is fixed or is configured by signaling.

The generation information of the downlink synchronization signal sequence is used for generating the downlink synchronization signal sequence. For example, the generation information of the downlink synchronization signal sequence includes an a1-bit synchronization signal identifier (ID). a1 is 8 or 16 or 20 or 24 or 30 or 32 or 36 or 40 or 48 or 64 or 128. The synchronization signal sequence is generated based on the synchronization signal ID.

The downlink synchronization signal configured by the base station may be one sequence or multiple sequences.

The downlink synchronization signals configured by the base station may be one or more (downlink synchronization signal sets).

After the UE enters the idle state, the UE receives the downlink synchronization signal or detects a downlink synchronization signal set according to downlink-synchronization-signal-related information configured in the connected state.

Downlink synchronization or paging area update or signal strength detection or state transition or PDCCH detection corresponding to paging is performed by using the downlink synchronization signal.

The state transition means that a state in which the UE uses, after release of the connected state, the paging configuration information or the synchronization configuration information configured in the connected state is the first idle state; and when the strength of the synchronization signal or the downlink synchronization signal is less than a threshold, the UE enters the second idle state. The UE detects the PDCCH corresponding to paging in the second idle state according to the paging configuration information configured through the system message. Alternatively, the UE accesses the network in the second idle state according to the access configuration information configured through the system message. Alternatively, the UE performs synchronization signal detection according to the predefined synchronization signal.

In an embodiment, after the UE accesses the network, the base station configures, through the UE-specific signaling, the time-domain location, frequency-domain location, and downlink synchronization signal sequence generation information of the downlink synchronization signal detected by the UE in the idle state or inactive state.

The period of the downlink synchronization signal is a multiple of the PDCCH search space period corresponding to the paging message detected by the UE, or the period of the downlink synchronization signal is a multiple of the PDCCH search space period corresponding to the access response message detected by the UE.

The value of the multiple is, for example, 1 or 2 or 4 or 8 or 16 or 32 or 64. The start subframe of the downlink synchronization signal is an offset relative to the start of the PDCCH search space. The offset is in units of radio frames or in units of subframes.

The downlink synchronization signal may be transmitted on multiple OFDM symbols in a subframe, for example, on n consecutive OFDM symbols, where n is a positive integer from 2 to 14, or may be transmitted on only one OFDM symbol.

The downlink synchronization signal is transmitted on M consecutive subframes starting from the start subframe. M is a positive integer, for example, a multiple of 2. Alternatively, the downlink synchronization signal is transmitted on R spaced subframes starting from the start subframe at intervals of g subframes, for example, on x+g*h subframes starting from subframe x. h is an integer from 0 to R−1. g is a predefined value or is configured by the UE-specific signaling. R is a predefined value or is configured by the UE-specific signaling.

The frequency-domain location of the downlink synchronization signal includes frequency point location information and the frequency-domain location based on the frequency point. For example, the corresponding frequency point location is indicated by signaling, and the offset location relative to the frequency point is indicated by another signaling to serve as the start location or the end location of the frequency domain of the downlink synchronization signal. The frequency-domain bandwidth of the downlink synchronization signal is fixed or is configured by signaling.

The generation information of the downlink synchronization signal sequence is used for generating the downlink synchronization signal sequence. For example, the generation information of the downlink synchronization signal sequence includes an a1-bit synchronization signal identifier (ID). a1 is 8 or 16 or 20 or 24 or 30 or 32 or 36 or 40 or 48 or 64 or 128. The synchronization signal sequence is generated based on the synchronization signal ID.

After the UE enters the idle state, the UE receives the downlink synchronization signal according to downlink-synchronization-signal-related information configured in the connected state. Downlink synchronization or paging area update or signal strength detection or state transition or PDCCH detection corresponding to paging is performed by using the downlink synchronization signal.

In an embodiment, after the UE accesses the network, the base station configures, through the UE-specific signaling, the time-domain location, frequency-domain location, and downlink synchronization signal sequence generation information of the downlink synchronization signal detected by the UE in the idle state or inactive state; and the base station configures, through the UE-specific signaling, the time-domain location, frequency-domain location, and downlink synchronization signal sequence generation information of the synchronization signal (third signal) detected by the UE in the idle state or inactive state.

The method for configuring the time-frequency location and the sequence information is described in the preceding embodiment and thus is not described in detail in this embodiment.

The downlink synchronization signal is used for synchronization and measurement. The third signal is used for paging detection and/or access response message detection.

The time-frequency location of the downlink synchronization signal is configured independently. The time-frequency location of the third signal is determined according to the time-frequency location of the PDCCH search space corresponding to paging and/or the time-frequency location of the PDCCH search space corresponding to the access response message.

In an embodiment, after the UE accesses the network, the base station configures, through the UE-specific signaling, PDCCH search space information corresponding to the paging message detected by the UE in the idle state or inactive state. The PDCCH search space information includes at least one of a time-frequency location, a period, an aggregation level, the number of candidate sets corresponding to the aggregation level, or the number of repetitions. The base station may also configure, through the UE-specific signaling, the receiving bandwidth information used when the UE detects the PDCCH. The base station may also configure, through the UE-specific signaling, the RNTI information used when the UE detects the PDCCH. After the UE enters the idle state, the UE detects the PDCCH according to the PDCCH search space information corresponding to the paging message configured in the connected state; and determines whether to access the network according to the detection result.

In an embodiment, after the UE accesses the network, the base station configures, through the UE-specific signaling, access-signal-related information or access-message-related information used by the UE to access the network in the idle state or inactive state.

The period corresponding to the access signal or the access message may be configured independently or may be determined according to the PDCCH search space period corresponding to the paging message. For example, the PDCCH period corresponding to the paging message is a multiple of the period corresponding to the access signal or the access message, or the period corresponding to the access signal or the access message is a fraction of the PDCCH period corresponding to the paging message, or the access signal or the access message occurs at intervals within the PDCCH search space period corresponding to each paging message, where the intervals and the number of occurrences are configured by the UE-specific signaling.

The subframe corresponding to the access signal or the access message may be configured independently or may be determined according to the start subframe or the end subframe of the PDCCH search space corresponding to the paging message. For example, the start subframe corresponding to the access signal or the access message is determined according to the offset of the start subframe or the end subframe of the PDCCH search space corresponding to the paging message. The offset is configured by the base station.

The base station configures, through the UE-specific signaling, the PDCCH search space information corresponding to the random access message detected by the UE in the idle state or inactive state.

The PDCCH search space information includes at least one of a time-frequency location, a period, an aggregation level, the number of candidate sets corresponding to the aggregation level, or the number of repetitions.

The period of the PDCCH search space corresponding to the random access message may be configured independently or may be determined according to the period of the access resource. For example, the period of the access signal or the access message is a multiple of the period of the PDCCH search space corresponding to the random access message, or the period of the PDCCH search space corresponding to the random access message is a fraction of the period of the access signal or the access message.

The base station may also configure, through the UE-specific signaling, the receiving bandwidth information used when the UE detects the PDCCH.

The base station may also configure, through the UE-specific signaling, the RNTI information used when the UE detects the PDCCH.

After the UE enters the idle state, when the UE requires to access the network, the UE sends the access signal or the access message according to the access signal or access message configuration information; and detects the PDCCH according to the PDCCH search space configuration information corresponding to the access response message to acquire the access response message.

In an embodiment, after the UE accesses the network, the base station configures, through the UE-specific signaling, multiple sets of access-signal-related information or access-message-related information used by the UE to access the network in the idle state or inactive state and multiple types of synchronization signals detected by the UE in the idle state or inactive state. Each type of synchronization signal corresponds to one or more sets of access-signal-related information or access-message-related information.

The UE detects multiple types of synchronization signals in the idle state. When there is a need to access the network, the UE determines the detected strongest synchronization signal, selects corresponding access signal (access message) information according to a correspondence between the synchronization signal and the access signal (access message), and the sends the access signal (access message) according to the access signal (access message) information.

In an embodiment, the downlink synchronization signals configured by the base station may be multiple (a downlink synchronization signal set). One downlink synchronization signal in the downlink synchronization signal set is a target signal.

After the UE enters the idle state, when the downlink synchronization signal detected at the location of the resource on which the downlink synchronization signal is sent, when the synchronization signal detected by the UE is different from the target signal, the UE initiates access and, after accessing the network, acquires new paging configuration and new synchronization signal configuration.

Alternatively, the base station configures one downlink synchronization signal. A sequence corresponding to the downlink synchronization signal is located in a predefined sequence set. After the UE enters the idle state, the UE detects all sequences in the predefined sequence set at the location of the resource on which the downlink synchronization signal is sent. When the detected sequence is different from the sequence corresponding to the downlink synchronization signal configured by the base station, the UE initiates access and, after accessing the network, acquires new paging configuration and new synchronization signal configuration. Alternatively, after the UE enters the idle state, when the strength of the third signal or the downlink synchronization signal detected by the UE is less than the threshold, the UE initiates access and, after accessing the network, acquires new paging configuration and new synchronization signal configuration.

In an embodiment, the terminal initiates an RRC connection setup, RRC connection resume, or early data transmission (EDT) request to a first base station to trigger an RRC connection setup, RRC connection resume or EDT transmission procedure.

The first base station sends a UE-specific connection setup or resume request to the core network or the first node. The core network or the first node sends a UE-specific connection setup or resumption response to the first base station. The first node is a new type of node between the base station and the core network. The first node may manage multiple base stations. There is a dedicated interface between the node and the core network (for example, AMF). There is a dedicated interface between the node and the base station.

At this time, the non-access stratum (NAS) is in the CM-connected (connection-management-connected) sate; a connection (S1 or Ng interface connection) retains between the base station and the core network; and the first base station, the core network, and the UE store UE context information simultaneously.

The base station may be a radio access network (RAN) device such as an eNB or a next-generation NB (gNB). The core network may be, for example, an evolved packet core (EPC) or a 5G core.

Manner One

The first base station determines paging message configuration information and/or access configuration information and/or downlink-synchronization-signal-related information detected by the UE in the idle state.

Manner Two

The second node or the core network determines paging message configuration information and/or access configuration information and/or downlink-synchronization-signal-related information detected by the UE in the idle state; and sends the determined information to the first base station accessed by the UE. The first base station receives the information.

The first base station sends an RRC connection release message carrying the information to the UE.

When the information is determined by the first base station, the first base station may send the determined information to the core network after sending the RRC connection release message to the UE.

After the UE releases the connected state or the core network learns that the UE has entered the idle state, the core network sends the information (paging message configuration information and/or access configuration information and/or downlink-synchronization-signal-related information detected by the UE in the idle state) configured through the RRC message to a target transmission node or a second base station. The second base station detects the access signal or access data or transmits the downlink synchronization signal according to the configuration information. The UE detects the synchronization signal and/or monitors paging and/or accesses the network according to the information. After receiving the RRC connection release message, the UE enters the RRC active state, the idle state, or the context suspend state.

The UE enters the idle state after receiving the RRC connection release message. The idle state may be divided into a first idle state and a second idle state. After the UE enters the idle state, the UE enters the first idle state and performs downlink synchronization, paging monitoring, or network access according to the RRC configuration information (paging message configuration information and/or access configuration information and/or downlink-synchronization-signal-related information detected by the UE in the idle state). When the UE does not detect the downlink synchronization signal or detects a downlink synchronization signal that does not satisfy the condition, the UE enters the second idle state, searches for a conventional downlink synchronization signal, acquires the system message, and monitors paging and accesses the network according to the paging configuration information and the access configuration information in the system message. Alternatively, when the UE does not detect the downlink synchronization signal or detects a downlink synchronization signal that does not satisfy the condition, the UE searches for a conventional downlink synchronization signal (similar to an LTE or NR periodic downlink synchronization signal), acquires the system message, and initiates access according to the access configuration information in the system message. Alternatively, when the UE does not detect the downlink synchronization signal or detects a downlink synchronization signal that does not satisfy the condition, the UE initiates access according to the access information configured by the RRC.

When the core network is to send the paging message, if the core network stores the paging message, the corresponding RRC configuration information (paging configuration information) of the UE is sent to a selected third base station or transmission node; and the base station or the transmission node receives the configuration information and transmits the paging message according to the configuration information.

The solution in each preceding embodiment can be applied to a 4G system, a 5G system, a 6G system, or a future network. The solution in each preceding embodiment can also be applied to a low-frequency point or a high-frequency point. The idle state in each preceding embodiment may be an idle state in a 4G system, may be an idle state or an inactive state in a 5G system, or may be a non-connected state, an idle state, an inactive state, or a new state defined in a future 6G system. In this state, part of the configuration information of the UE in the connected state is maintained, and part of the configuration information of the UE in the connected state is released.

Figure 5:
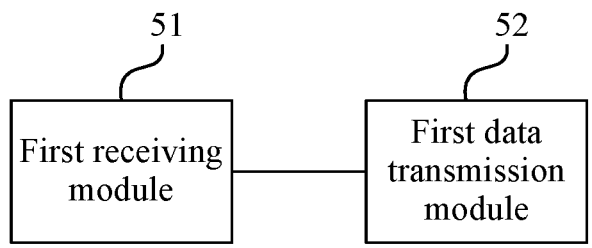
FIG. 5 is a diagram of a data transmission apparatus according to an embodiment of the present application.

In an embodiment, a data transmission apparatus is provided. As shown in FIG. 5, the data transmission apparatus of this embodiment includes a first receiving module 51 and a first data transmission module 52. The data transmission apparatus of this embodiment is configured on a first node.

The first receiving module 51 is configured to, in the case where the first node is in the connected state, receive first-node-specific signaling, where the first-node-specific signaling carries idle-state transmission configuration information. The first data transmission module 52 is configured to, in the case where the first node is in the idle state, perform data transmission with a second node according to the idle-state transmission configuration information.

In an example embodiment, the first-node-specific signaling includes radio resource control (RRC) signaling.

In an example embodiment, the idle-state transmission configuration information includes at least one of configuration information of a downlink synchronization signal, paging configuration information, or access configuration information.

In an example embodiment, the configuration information of the downlink synchronization signal includes at least one of generation information of a downlink synchronization signal sequence or time-frequency location information of the downlink synchronization signal, where the generation information of the downlink synchronization signal sequence is used for generating the downlink synchronization signal sequence, and the time-frequency location information of the downlink synchronization signal includes time-domain location information of the downlink synchronization signal and frequency-domain location information of the downlink synchronization signal.

In an example embodiment, the time-frequency location information of the downlink synchronization signal includes at least one of a first period, a start subframe, the number of consecutive subframes, or the number of spaced subframes.

In an example embodiment, the time-domain location of the downlink synchronization signal includes at least one of the following: the downlink synchronization signal being transmitted on multiple orthogonal frequency-division multiplexing (OFDM) symbols in a subframe; the downlink synchronization signal being transmitted on M consecutive subframes from the start subframe, where M is a positive integer; or the downlink synchronization signal being transmitted on R subframes at intervals of G subframes from the start subframe, where R is a positive integer, and G is a positive integer greater than or equal to R.

In an example embodiment, the first period is a multiple of a search space period corresponding to a paging message or a multiple of a search space period corresponding to an access response message.

In an example embodiment, the start subframe or the end subframe of the downlink synchronization signal is determined by the relative offset and the start subframe of a search space corresponding to a paging message.

In an example embodiment, the frequency-domain location information of the downlink synchronization signal includes at least one of the following: frequency point location information, a frequency-domain location, or a frequency-domain offset.

In an example embodiment, the paging configuration information includes at least one of a paging radio network temporary identifier (RNTI), information about a paging search space, or paging synchronization signal configuration information.

In an example embodiment, the information about the paging search space includes at least one of the following: a second period, an aggregation level, the number of candidate sets corresponding to the aggregation level, the number of repetitions, or a time-frequency location of the paging search space.

In an example embodiment, the access configuration information includes at least one of a third period, an access signal type, an access response search space, or location information of an access resource.

In an example embodiment, the third period is determined in at least one of the following manners: being configured through signaling; or being determined according to a search space period corresponding to a paging message.

In an example embodiment, the time-domain location in the location information of the access resource is determined according to the time-domain location offset of the paging search space.

In an example embodiment, the start time-domain location of the downlink synchronization signal is located before the start time-domain location of the paging search space, or the start time-domain location of the paging search space is located before the start time-domain location of the access resource, or the start time-domain location of the access resource is located before the start time-domain location of the access response search space.

In an example embodiment, the downlink synchronization signal, the paging search space, and the access response search space are located at the same frequency point.

In an example embodiment, the downlink synchronization signal, the paging search space, and the access response search space are received within continuous resources in the same bandwidth part (BWP).

In an example embodiment, performing the data transmission with the second node according to the idle-state transmission configuration information includes at least one of the following: receiving the downlink synchronization signal according to the configuration information of the downlink synchronization signal; receiving a paging message according to the paging configuration information; or sending an access signal or access information according to the access configuration information.

In an example embodiment, receiving the paging message according to the paging configuration information includes detecting, on the paging search space, a physical downlink control channel (PDCCH) scrambled by the paging RNTI; or in the case where a paging message corresponding to the first node is received, sending the access signal or the access information at the position of the access resource, and detecting an access response on the access response search space.

In an example embodiment, receiving the downlink synchronization signal according to the configuration information of the downlink synchronization signal includes at least one of the following: in the case where a detected paging downlink synchronization signal is different from a paging downlink synchronization signal configured through the paging configuration information, sending the access signal or the access information at the location of the access resource; in the case where a detected downlink synchronization signal is different from the downlink synchronization signal configured through the configuration information of the downlink synchronization signal, sending the access signal or the access information at the location of the access resource; in the case where the strength of a detected downlink synchronization signal is less than a preset strength threshold, sending the access signal or the access information at the location of the access resource; or in the case where the strength of a detected paging downlink synchronization signal is less than a preset strength threshold, sending the access signal or the access information at the location of the access resource.

In an example embodiment, the idle state includes a first idle state, where the first idle state refers to a state in which the first node releases connected-state transmission configuration information, retains the idle-state transmission configuration information configured in the connected state, and performs detection according to the idle-state transmission configuration information.

In an example embodiment, the idle state includes a first idle state and a second idle state, where the second idle state is a state in which the first node detects, after releasing the connected-state transmission configuration information, a paging-corresponding PDCCH according to paging configuration information configured through a system message or a state in which the first node performs synchronization signal detection according to a predefined synchronization signal after releasing the connected-state transmission configuration information.

The second idle state may also be the inactive state or the idle state in an LTE or NR system.

In an example embodiment, the condition under which the first node switches from the first idle state to the second idle state includes at least one of the following: a detected paging downlink synchronization signal is different from a paging downlink synchronization signal configured through the paging configuration information; a detected downlink synchronization signal is different from a downlink synchronization signal configured through configuration information of the downlink synchronization signal; the strength of a detected downlink synchronization signal is less than a first preset strength threshold; or the strength of a detected paging downlink synchronization signal is less than a second preset strength threshold.

Figure 6:
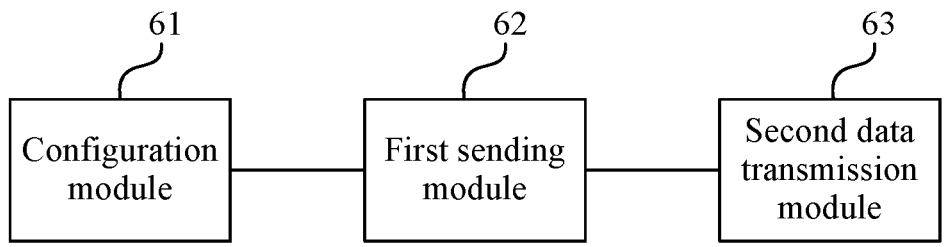
FIG. 6 is a diagram of a data transmission apparatus according to an embodiment of the present application.

In an embodiment, a data transmission apparatus is provided. As shown in FIG. 6, the data transmission apparatus of this embodiment includes a configuration module 61, a first sending module 62, and a second data transmission module 63. The data transmission apparatus of this embodiment is configured on a second node.

The configuration module 61 is configured to, in the case where a first node is in the connected state, configure first-node-specific signaling, where the first-node-specific signaling carries idle-state transmission configuration information. The first sending module 62 is configured to send the first-node-specific signaling to the first node. The second data transmission module 63 is configured to, after the first node enters the idle state, perform data transmission with the first node according to the idle-state transmission configuration information.

In an example embodiment, the idle-state transmission configuration information includes at least one of configuration information of a downlink synchronization signal, paging configuration information, or access configuration information.

In an example embodiment, performing the data transmission with the first node according to the idle-state transmission configuration information includes at least one of the following: sending the downlink synchronization signal according to the configuration information of the downlink synchronization signal; sending a paging message for the first node according to the paging configuration information; or receiving an access signal or access information of the first node according to the access configuration information.

In an example embodiment, the method also includes sending the idle-state transmission configuration information to a third node.

In an example embodiment, the first-node-specific signaling includes radio resource control (RRC) signaling.

In an example embodiment, the configuration information of the downlink synchronization signal includes at least one of generation information of a downlink synchronization signal sequence or time-frequency location information of the downlink synchronization signal, where the generation information of the downlink synchronization signal sequence is used for generating the downlink synchronization signal sequence, and the time-frequency location information of the downlink synchronization signal includes time-domain location information of the downlink synchronization signal and frequency-domain location information of the downlink synchronization signal.

In an example embodiment, the time-frequency location information of the downlink synchronization signal includes at least one of a first period, a start subframe, the number of consecutive subframes, or the number of spaced subframes.

In an example embodiment, the time-domain location of the downlink synchronization signal includes at least one of the following: the downlink synchronization signal being transmitted on multiple orthogonal frequency-division multiplexing (OFDM) symbols in a subframe; the downlink synchronization signal being transmitted on M consecutive subframes from the start subframe, where M is a positive integer; or the downlink synchronization signal being transmitted on R subframes at intervals of G subframes from the start subframe, where R is a positive integer, and G is a positive integer greater than or equal to R.

In an example embodiment, the first period is a multiple of a search space period corresponding to a paging message or a multiple of a search space period corresponding to an access response message.

In an example embodiment, the start subframe or the end subframe of the downlink synchronization signal is determined by the relative offset and the start subframe of a search space corresponding to a paging message.

In an example embodiment, the frequency-domain location information of the downlink synchronization signal includes at least one of the following: frequency point location information, a frequency-domain location, or a frequency-domain offset.

In an example embodiment, the paging configuration information includes at least one of a paging radio network temporary identifier (RNTI), information about a paging search space, or paging synchronization signal configuration information.

In an example embodiment, the information about the paging search space includes at least one of the following: a second period, an aggregation level, the number of candidate sets corresponding to the aggregation level, the number of repetitions, or a time-frequency location of the paging search space.

In an example embodiment, the access configuration information includes at least one of a third period, an access signal type, an access response search space, or location information of an access resource.

In an example embodiment, the third period is determined in at least one of the following manners: being configured through signaling; or being determined according to a search space period corresponding to a paging message.

In an example embodiment, the time-domain location in the location information of the access resource is determined according to the time-domain location offset of the paging search space.

In an example embodiment, the start time-domain location of the downlink synchronization signal is located before the start time-domain location of the paging search space, or the start time-domain location of the paging search space is located before the start time-domain location of the access resource, or the start time-domain location of the access resource is located before the start time-domain location of the access response search space.

In an example embodiment, the downlink synchronization signal, the paging search space, and the access response search space are located at the same frequency point.

In an example embodiment, the downlink synchronization signal, the paging search space, and the access response search space are received within continuous resources in the same bandwidth part (BWP).

In an example embodiment, receiving the paging message according to the paging configuration information includes detecting, on the paging search space, a physical downlink control channel (PDCCH) scrambled by the paging RNTI; or in the case where a paging message corresponding to the first node is received, sending the access signal or the access information at the position of the access resource, and detecting an access response on the access response search space.

In an example embodiment, the idle state includes a first idle state, where the first idle state refers to a state in which the first node releases connected-state transmission configuration information, retains the idle-state transmission configuration information configured in the connected state, and performs detection according to the idle-state transmission configuration information.

In an example embodiment, the idle state includes a first idle state and a second idle state, where the second idle state is a state in which the first node detects, after releasing the connected-state transmission configuration information, a paging-corresponding PDCCH according to paging configuration information configured through a system message or a state in which the first node performs synchronization signal detection according to a predefined synchronization signal after releasing the connected-state transmission configuration information.

In an example embodiment, the condition under which the first node switches from the first idle state to the second idle state includes at least one of the following: a detected paging downlink synchronization signal is different from a paging downlink synchronization signal configured through the paging configuration information; a detected downlink synchronization signal is different from a downlink synchronization signal configured through configuration information of the downlink synchronization signal; the strength of a detected downlink synchronization signal is less than a first preset strength threshold; or the strength of a detected received paging downlink synchronization signal is less than a second preset strength threshold.

Figure 7:
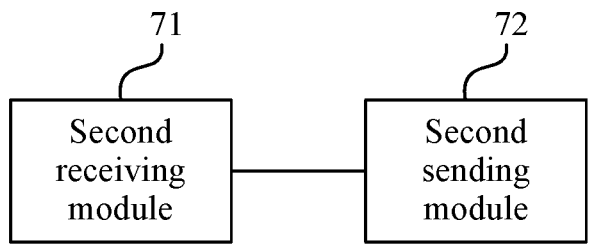
FIG. 7 is a diagram of a data transmission apparatus according to an embodiment of the present application.

In an embodiment, a data transmission apparatus is provided. As shown in FIG. 7, the data transmission apparatus of this embodiment includes a second receiving module 71 and a second sending module 72. The data transmission method of this embodiment is applied to a third node.

The second receiving module 71 is configured to receive idle-state transmission configuration information of a first node sent by a second node, where the idle-state transmission configuration information is used for data transmission between the second node and the first node when the first node is in the idle state.

The second sending module 72 is configured to, in the case where a paging message for the first node is stored on the third node, send the idle-state transmission configuration information to a fourth node.

Figure 8:
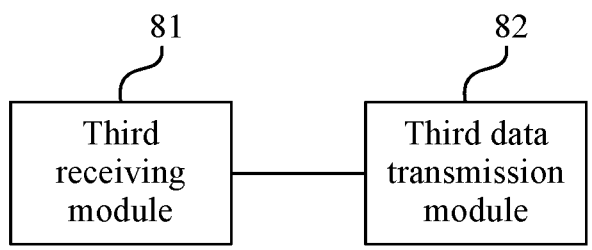
FIG. 8 is a diagram of a data transmission apparatus according to an embodiment of the present application.

In an embodiment, a data transmission apparatus is provided. As shown in FIG. 8, the data transmission apparatus of this embodiment includes a third receiving module 81 and a third data transmission module 82. The data transmission apparatus of this embodiment is configured on a fourth node.

The third receiving module 81 is configured to receive idle-state transmission configuration information of a first node sent by a third node. The third data transmission module 82 is configured to perform data transmission with the first node according to the idle-state transmission configuration information.

The data transmission apparatus of this embodiment may perform the data transmission method of any embodiment of the present application and has function modules and effects corresponding to the performed method. For details not described in this embodiment, reference may be made to the data transmission method of any embodiment of the present application.

Units and modules in the embodiment of the data transmission apparatus are divided according to function logic or divided in any other manner as long as the corresponding functions can be achieved. Additionally, the names of the function units are intended to distinguish between the function units and not to limit the scope of embodiments of the present application.

Figure 9:
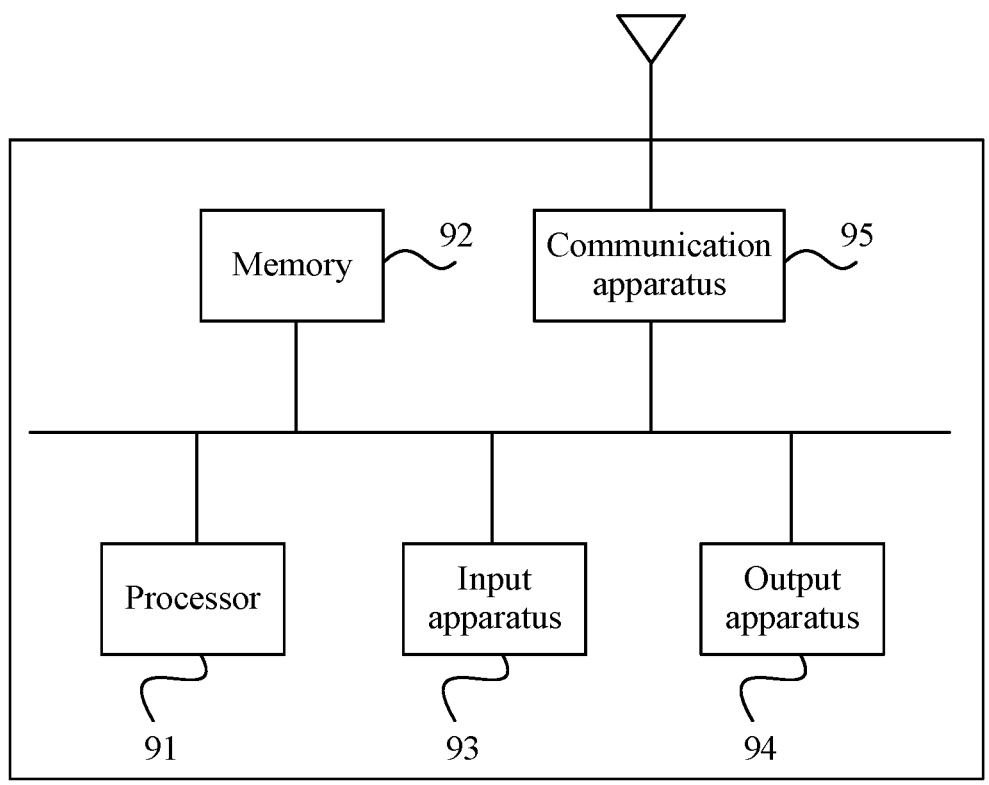
FIG. 9 is a diagram illustrating the structure of a device according to an embodiment of the present application.

An embodiment of the present application provides a device. FIG. 9 is a diagram illustrating the structure of the device according to this embodiment of the present application. As shown in FIG. 9, the device includes a processor 91, a memory 92, an input apparatus 93, an output apparatus 94, and a communication apparatus 95. One or more processors 91 may be provided in the device. One processor 91 is used as an example in FIG. 9. The processor 91, the memory 92, the input apparatus 93, and the output apparatus 94 in the device may be connected through a bus or in another manner. In FIG. 9, connection through a bus is performed by way of example.

As a computer-readable storage medium, the memory 92 is used for storing software programs and computer-executable programs and modules. The processor 91 executes software programs, instructions, and modules stored in the memory 92 to perform various function applications and data processing of the device, that is, to implement the method of any embodiment of the present application.

The memory 92 may mainly include a program storage region and a data storage region, where the program storage region may store an operating system and an application program required by at least one function while the data storage region may store data created depending on use of a device. Additionally, the memory 92 may include a high-speed random-access memory and may also include a non-volatile memory such as at least one disk memory, flash memory, or another nonvolatile solid-state memory. In some examples, the memory 92 may include memories which are remotely disposed relative to the processor 91, and these remote memories may be connected to the device via a network. Examples of the preceding network include, but are not limited to, the Internet, an intranet, a local area network, a mobile communication network, and a combination thereof.

The input apparatus 93 may be configured to receive inputted digital or character information and generate key signal input related to user settings and function control of the device. The output apparatus 94 may include a display device such as a display screen.

The communication apparatus 95 may include a receiver and a transmitter. The communication apparatus 95 is configured to perform information transceiving and communication under the control of the processor 91.

In an example embodiment of the present application, a storage medium including computer-executable instructions is provided. When the computer-executable instructions are executed by a computer processor, a data transmission method is performed. The method is applied to a first node.

The method includes, in the case where the first node is in the connected state, receiving first-node-specific signaling, where the first-node-specific signaling carries idle-state transmission configuration information; and in the case where the first node is in the idle state, performing data transmission with a second node according to the idle-state transmission configuration information.

In the storage medium of this embodiment of the present application, when the computer-executable instructions are executed, not only the preceding method operations, but also related operations in the data transmission method of any embodiment of the present application are implemented.

In an example embodiment of the present application, a storage medium including computer-executable instructions is provided. When the computer-executable instructions are executed by a computer processor, a data transmission method is performed. The method is applied to a second node.

The method includes, in the case where a first node is in the connected state, configuring first-node-specific signaling, where the first-node-specific signaling carries idle-state transmission configuration information; sending the first-node-specific signaling to the first node; and after the first node enters the idle state, performing data transmission with the first node according to the idle-state transmission configuration information.

In the storage medium of this embodiment of the present application, when the computer-executable instructions are executed, not only the preceding method operations, but also related operations in the data transmission method of any embodiment of the present application are implemented.

In an example embodiment of the present application, a storage medium including computer-executable instructions is provided. When the computer-executable instructions are executed by a computer processor, a data transmission method is performed. The method is applied to a third node.

The method includes receiving idle-state transmission configuration information of a first node sent by a second node, where the idle-state transmission configuration information is used for data transmission between the second node and the first node when the first node is in the idle state; and in the case where a paging message for the first node is stored on the third node, sending the idle-state transmission configuration information to a fourth node.

In the storage medium of this embodiment of the present application, when the computer-executable instructions are executed, not only the preceding method operations, but also related operations in the data transmission method of any embodiment of the present application are implemented.

In an example embodiment of the present application, a storage medium including computer-executable instructions is provided. When the computer-executable instructions are executed by a computer processor, a data transmission method is performed. The method is applied to a fourth node.

The method includes receiving idle-state transmission configuration information of a first node sent by a third node; and performing data transmission with the first node according to the idle-state transmission configuration information.

In the storage medium of this embodiment of the present application, when the computer-executable instructions are executed, not only the preceding method operations, but also related operations in the data transmission method of any embodiment of the present application are implemented.

From the preceding description of embodiments, the present application may be implemented by both software and required general-purpose hardware or by hardware. The technical solutions of the present application may be essentially embodied in the form of a software product. The software product in a computer may be stored in a computer-readable storage medium such as a floppy disk, a read-only memory (ROM), a random-access memory (RAM), a flash memory, a hard disk or an optical disc in the computer and includes several instructions for enabling a computer device (which may be a personal computer, a server or a network device) to perform the method of the embodiments of the present application.

The term user terminal encompasses any appropriate type of wireless user device such as a mobile phone, a portable data processing apparatus, a portable web browser or a vehicle-mounted mobile station.

In general, various embodiments of the present application may be implemented in hardware or special-purpose circuits, software, logics, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable for a local technical environment and may be implemented using any suitable data storage technology, such as, but not limited to, a read-only memory (ROM), a random access memory (RAM) and an optical memory apparatus and system (a digital video disc (DVD) or a compact disk (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA), or a processor based on a multi-core processor architecture.

What is claimed is:

1. A data transmission method, the method being applied to a first node and comprising:
   in response to the first node being in a connected state, receiving first-node-specific signaling, wherein the first-node-specific signaling carries idle-state transmission configuration information; and
   in response to the first node being in an idle state, performing data transmission with a second node according to the idle-state transmission configuration information;
   wherein the idle-state transmission configuration information comprises at least one of configuration information of a downlink synchronization signal, paging configuration information, or access configuration information;
   wherein performing the data transmission with the second node according to the idle-state transmission configuration information comprises at least one of the following:
   receiving the downlink synchronization signal according to the configuration information of the downlink synchronization signal;
   receiving a paging message according to the paging configuration information; or
   sending an access signal or access information according to the access configuration information.

2. The method of claim 1, wherein the first-node-specific signaling comprises radio resource control (RRC) signaling.

3. The method of claim 1, wherein the configuration information of the downlink synchronization signal comprises at least one of generation information of a downlink synchronization signal sequence or time-frequency location information of the downlink synchronization signal, wherein the generation information of the downlink synchronization signal sequence is used for generating the downlink synchronization signal sequence, and the time-frequency location information of the downlink synchronization signal comprises time-domain location information of the downlink synchronization signal and frequency-domain location information of the downlink synchronization signal.

4. The method of claim 3, wherein the time-frequency location information of the downlink synchronization signal comprises at least one of a first period, a start subframe, a number of consecutive subframes, or a number of spaced subframes.

5. The method of claim 4, wherein the first period is a multiple of a search space period corresponding to a paging message or a multiple of a search space period corresponding to an access response message.

6. The method of claim 4, wherein a start subframe or an end subframe of the downlink synchronization signal is determined by a relative offset and a start subframe of a search space corresponding to a paging message.

7. The method of claim 1, wherein the paging configuration information comprises at least one of a paging radio network temporary identifier (RNTI), information about a paging search space, or paging synchronization signal configuration information;
   wherein the information about the paging search space comprises at least one of the following:
   a second period, an aggregation level, a number of candidate sets corresponding to the aggregation level, a number of repetitions, or a time-frequency location of the paging search space.

8. The method of claim 1, wherein the access configuration information comprises at least one of a third period, an access signal type, an access response search space, or location information of an access resource.

9. The method of claim 8,
   wherein the third period is determined in at least one of the following manners:
   being configured through signaling; or
   being determined according to a search space period corresponding to a paging message; or
   wherein a time-domain location in the location information of the access resource is determined according to a time-domain location offset of the paging search space; or wherein a start time-domain location of the downlink synchronization signal is located before a start time-domain location of the paging search space, or a start time-domain location of the paging search space is located before a start time-domain location of the access resource, or a start time-domain location of the access resource is located before a start time-domain location of the access response search space; or wherein the downlink synchronization signal, the paging search space, and the access response search space are located at a same frequency point.

10. The method of claim 8, wherein the downlink synchronization signal, the paging search space, and the access response search space are received within continuous resources in a same bandwidth part (BWP).

11. The method of claim 1, wherein receiving the paging message according to the paging configuration information comprises:

detecting, on the paging search space, a physical downlink control channel (PDCCH) scrambled by the paging RNTI; or in the case where a paging message corresponding to the first node is received, sending the access signal or the access information at a position of the access resource, and detecting an access response on the access response search space.

12. The method of claim 1, wherein receiving the downlink synchronization signal according to the configuration information of the downlink synchronization signal comprises at least one of the following:

in response to a detected paging downlink synchronization signal being different from a paging downlink synchronization signal configured through the paging configuration information, sending the access signal or the access information at a location of the access resource;

in response to a detected downlink synchronization signal being different from the downlink synchronization signal configured through the configuration information of the downlink synchronization signal, sending the access signal or the access information at a location of the access resource;

in response to a strength of a detected downlink synchronization signal being less than a preset strength threshold, sending the access signal or the access information at a location of the access resource; or in response to a strength of a detected paging downlink synchronization signal being less than a preset strength threshold, sending the access signal or the access information at a location of the access resource.

13. The method of claim 1, wherein the idle state comprises a first idle state, wherein the first idle state refers to a state in which the first node releases connected-state transmission configuration information, retains the idle-state transmission configuration information configured in a connected state, and performs detection according to the idle-state transmission configuration information.

14. The method of claim 1, wherein the idle state comprises a first idle state and a second idle state, wherein the first idle state refers to a state in which the first node releases connected-state transmission configuration information, retains the idle-state transmission configuration information configured in a connected state, and performs detection according to the idle-state transmission configuration information; and the second idle state is a state in which the first node detects, after releasing the connected-state transmission configuration information, a paging-corresponding PDCCH according to paging configuration information configured through a system message or a state in which the first node performs synchronization signal detection according to a predefined synchronization signal after releasing the connected-state transmission configuration information.

15. The method of claim 14, wherein a condition under which the first node switches from the first idle state to the second idle state comprises at least one of the following:

a detected paging downlink synchronization signal being different from a paging downlink synchronization signal configured through the paging configuration information;

a detected downlink synchronization signal being different from a downlink synchronization signal configured through configuration information of the downlink synchronization signal;

a strength of a detected downlink synchronization signal being less than a first preset strength threshold; or a strength of a detected paging downlink synchronization signal being less than a second preset strength threshold.

16. A data transmission method, the method being applied to a second node and comprising:

in response to a first node being in a connected state, configuring first-node-specific signaling, wherein the first-node-specific signaling carries idle-state transmission configuration information;

sending the first-node-specific signaling to the first node; and after the first node enters an idle state, performing data transmission with the first node according to the idle-state transmission configuration information;

wherein the idle-state transmission configuration information comprises at least one of configuration information of a downlink synchronization signal, paging configuration information, or access configuration information;

wherein performing the data transmission with the first node according to the idle-state transmission configuration information comprises at least one of the following:

sending the downlink synchronization signal according to the configuration information of the downlink synchronization signal;

sending a paging message for the first node according to the paging configuration information; or receiving an access signal or access information of the first node according to the access configuration information.

17. The method of claim 16, wherein the method further comprises: sending the idle-state transmission configuration information to a third node.

18. A device, comprising:

at least one processor; and a memory configured to store at least one program, wherein the at least one processor is configured to, when executing the at least one program, perform the following:

in response to a first node being in a connected state, receiving first-node-specific signaling, wherein the first-node-specific signaling carries idle-state transmission configuration information; and in response to the first node being in an idle state, performing data transmission with a second node according to the idle-state transmission configuration information;

wherein the idle-state transmission configuration information comprises at least one of configuration information of a downlink synchronization signal, paging configuration information, or access configuration information;

wherein the at least one processor is configured to perform the data transmission with the second node according to the idle-state transmission configuration information in at least one of the following manners:

receiving the downlink synchronization signal according to the configuration information of the downlink synchronization signal;

receiving a paging message according to the paging configuration information; or sending an access signal or access information according to the access configuration information.

19. The device of claim 18, wherein the first-node-specific signaling comprises radio resource control (RRC) signaling.

20. A device, comprising:

at least one processor; and a memory configured to store at least one program, wherein the at least one processor is configured to perform the data transmission method of claim 16 when executing the at least one program.

\* \* \* \* \*